US012134936B2

(12) United States Patent
Mora

(10) Patent No.: US 12,134,936 B2
(45) Date of Patent: Nov. 5, 2024

(54) COMPOSITE RUNG FOR A LADDER

(71) Applicant: Werner Co., Greenville, PA (US)

(72) Inventor: Daniel C. Mora, Transfer, PA (US)

(73) Assignee: Werner Co., Greenville, PA (US)

( * ) Notice: Subject to any disclaimer, the term of this patent is extended or adjusted under 35 U.S.C. 154(b) by 984 days.

(21) Appl. No.: 17/005,084

(22) Filed: Aug. 27, 2020

(65) Prior Publication Data

US 2021/0025231 A1 Jan. 28, 2021

Related U.S. Application Data

(62) Division of application No. 14/446,024, filed on Jul. 29, 2014, now Pat. No. 10,760,335.

(51) Int. Cl.
E06C 7/08 (2006.01)
B21J 15/02 (2006.01)
F16B 5/04 (2006.01)

(52) U.S. Cl.
CPC .............. *E06C 7/082* (2013.01); *B21J 15/02* (2013.01); *E06C 7/084* (2013.01); *E06C 7/08* (2013.01); *F16B 5/04* (2013.01)

(58) Field of Classification Search
CPC .. E06C 7/08; E06C 7/084; E06C 7/082; B21J 15/02
See application file for complete search history.

(56) References Cited

U.S. PATENT DOCUMENTS

| 848,114 A | 3/1907 | Medart |
| 1,779,370 A | 10/1930 | Pfeil |
| 2,618,427 A | 11/1952 | Langley |
| 2,855,134 A | 10/1958 | Arnold |
| 3,158,224 A * | 11/1964 | Van Name ................ E06C 7/08 403/186 |
| 3,283,402 A | 11/1966 | Larson |
| 3,454,130 A | 7/1969 | Pellandine |
| 3,674,110 A * | 7/1972 | Cooke .................... B29C 70/08 182/46 |
| 3,871,481 A | 3/1975 | Ballek |
| 3,997,027 A | 12/1976 | Patterson |
| 4,029,172 A * | 6/1977 | Green ................ B29D 99/0017 182/46 |
| 4,261,436 A | 4/1981 | Stillman, Jr. |

(Continued)

FOREIGN PATENT DOCUMENTS

| AU | 645404 | 9/1993 |
| CA | 2075137 | 2/1993 |

(Continued)

OTHER PUBLICATIONS

Examination Report in GB1512794.7, dated Jan. 27, 2026, 3 pages.

Primary Examiner — Gregory J Strimbu
(74) Attorney, Agent, or Firm — Fitch, Even, Tabin & Flannery LLP

(57) ABSTRACT

A ladder having a first fiberglass rail. The ladder having a second fiberglass rail. The ladder having a one-piece composite rung which is hollow and made of carbon fiber or glass. The rung has a middle and a first end and a second end. The ladder having rivets that extend through the first end and the second end of the rung to attach the rung to the first rail and the second rail. No portion of the rung penetrates any portion of the first or second rails.

12 Claims, 5 Drawing Sheets

(56) References Cited

U.S. PATENT DOCUMENTS

| | | | |
|---|---|---|---|
| 4,742,890 A * | 5/1988 | de Blauw | E04G 1/153 182/222 |
| 6,866,117 B2 | 3/2005 | Moss | |
| 7,410,433 B2 * | 8/2008 | Guenther | A63B 60/54 473/567 |
| 10,760,335 B2 | 9/2020 | Mora | |
| 2002/0003062 A1 * | 1/2002 | Branca | B29D 12/00 182/228.1 |
| 2007/0205053 A1 * | 9/2007 | Isham | E06C 7/08 182/207 |
| 2008/0023268 A1 * | 1/2008 | Kelly | E06C 7/081 156/166 |
| 2008/0236949 A1 | 10/2008 | Lin | |
| 2010/0196637 A1 | 8/2010 | Lippert | |
| 2011/0209947 A1 | 9/2011 | Allred, III | |
| 2011/0283518 A1 | 11/2011 | Kelly | |
| 2012/0160609 A1 | 6/2012 | Moss | |
| 2014/0102830 A1 * | 4/2014 | Ahmed | B29C 55/30 264/136 |
| 2014/0239531 A1 * | 8/2014 | Jiansheng | B29C 70/68 264/46.4 |
| 2016/0032650 A1 | 2/2016 | Mora | |

FOREIGN PATENT DOCUMENTS

| | | |
|---|---|---|
| DE | 19539157 | 4/1997 |
| DE | 102005043934 | 3/2007 |
| EP | 0691453 | 1/1996 |
| FR | 768455 | 8/1934 |
| FR | 2916794 | 12/2008 |
| GB | 657746 | 9/1951 |
| GB | 746956 | 3/1956 |
| GB | 923788 * | 4/1963 |
| GB | 1352069 | 5/1974 |
| GB | 2457936 | 9/2009 |
| GB | 2481235 A | 12/2011 |

* cited by examiner

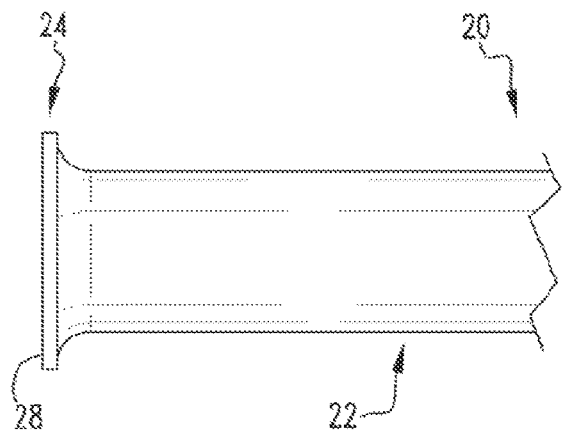
FIG.2
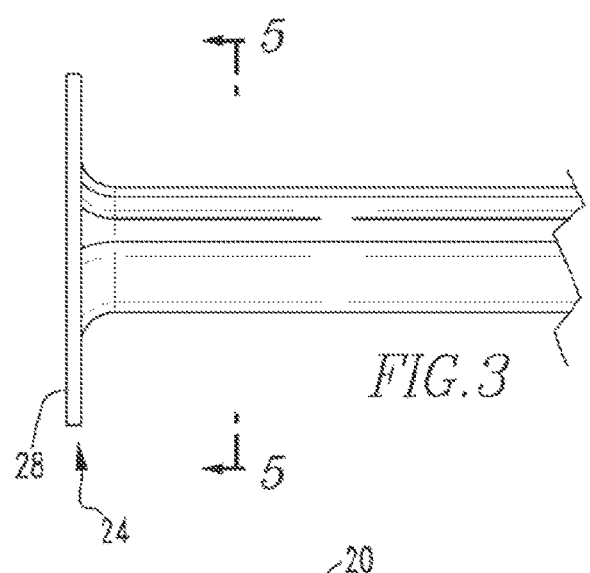
FIG.3
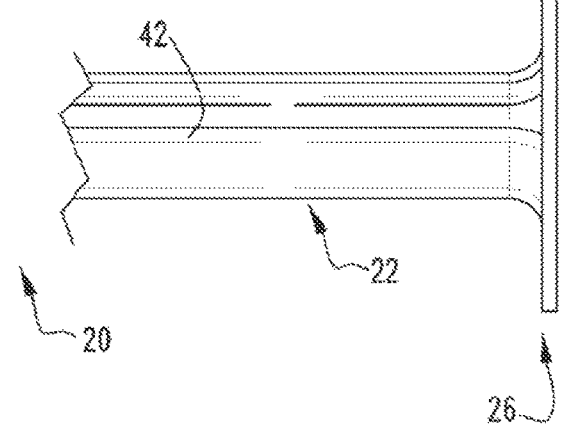
FIG.4
FIG.5

COMPOSITE RUNG FOR A LADDER

CROSS-REFERENCE TO RELATED APPLICATIONS

This is a continuation of U.S. patent application Ser. No. 14/446,024 filed Jul. 29, 2014, now U.S. Pat. No. 10,760,335, incorporated by reference herein.

FIELD OF THE INVENTION

The present invention is related to a ladder having a one-piece composite rung. (As used herein, references to the "present invention" or "invention" relate to exemplary embodiments and not necessarily to every embodiment encompassed by the appended claims.) More specifically, the present invention is related to a ladder having a one-piece composite rung that is riveted to opposing rails of the ladder where no portion of the rung penetrates any portion of the rails.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

One primary factor in the design of a ladder is safety. The user of the ladder and the appurtenances the user uses when on the ladder must be stably and securely supported without concern that some aspect of the ladder will fail, resulting in injury to the user or damage to the appurtenances.

Another important factor in the design of the ladder is weight. The ladder should be as light as possible for its function while being safe so the ladder may be moved as easily as possible and not being cumbersome.

Current technology in regard to the production of ladder rungs is limited by aluminum forming applications. There are 2 styles of aluminum rungs: 1) Swaged joint rung assembly has 5 parts (2—rung plates, 2—ferrules and 1—pre-cut rung) that are swaged together to form a rung assembly. 2) Beaded rung assembly has 3 parts (1—pre-cut rung and 2 rung plates). This invention requires one process to mold a rung with no other forming processes after the rung has been molded.

BRIEF SUMMARY OF THE INVENTION

The present invention utilizes a composite rung of a ladder that is sturdy and light weight and safe.

The present invention pertains to a ladder. The ladder comprises a first fiberglass rail having a web with an inner face surface. The ladder comprises a second fiberglass rail having a web with an inner face surface. The ladder comprises a one-piece composite rung which is hollow and made of carbon fiber or glass that is at least 12 inches long and weighs no more than 0.35 pounds. The rung has a middle and a first end and a second end. Each end flares outward from the middle to define a flat face having a shape which corresponds with the web's inner face surface to which the flat face attaches. The ladder comprises rivets that extend through the faces and the inner face surface of the web of the rails to attach the rung to the first rail and the second rail. No portion of the rung penetrates any portion of the first or second rails.

The present invention pertains to a method for producing a ladder. The method comprises the steps of riveting with steel rivets that extend through a flat face of a first end of a composite rung and an inner face surface of a web of a first rail to attach the first end of the rung to the first rail; and the second rail. There is the step of riveting with steel rivets that extend through a flat face of a second end of the composite rung and an inner face surface of a web of a second rail to attach the second end of the rung to the second rail. The composite rung being one piece which is hollow and made of carbon fiber or glass that is at least 12 inches long and weighs no more than 0.35 pounds. The rung having a middle and the first end and the second end. Each end flares outward from the middle to define the flat face of the first end and the flat face of the second end. The flat face of the first end and the flat face of the second end having a shape which corresponds with the first rail web's inner face surface and the second rail web's inner face surface, respectively, to which the flat face of the first rail and the second rail, respectively, attaches. No portion of the rung penetrating any portion of the first or second rails.

The present invention pertains to a method for forming a one-piece composite rung for a ladder. The method comprises the steps of placing carbon fibers in a logo side of a tool. There is the step of placing carbon fibers in a rounded side of the tool. There is the step of putting the logo side with the carbon fibers and the rounded side with the carbon side of the tool together. There is the step of autoclaving the tool with the logo and rounded sides together to form the rung with a first side having a flat face and a second side having a flat face.

The present invention pertains to a method for using a ladder. The method comprises the steps of moving the ladder to a desired location. The ladder having a composite rung that is riveted to a first rail of the ladder and a second rail of the ladder opposing the first rail of the ladder with no portion of the rung penetrating any portion of the first or second rails. There is the step of placing the ladder into a desired position to be climbed.

BRIEF DESCRIPTION OF THE SEVERAL VIEWS OF THE DRAWING

In the accompanying drawings, the preferred embodiment of the invention and preferred methods of practicing the invention are illustrated in which:

FIG. 2 shows a logo side view of the rung.

FIG. 3 shows a rounded side view of the rung.

FIG. 4 shows an axial view of the rung.

FIG. 5 is a cross-sectional view of the rung as identified from FIG. 3.

DETAILED DESCRIPTION OF THE INVENTION

Figure 1:
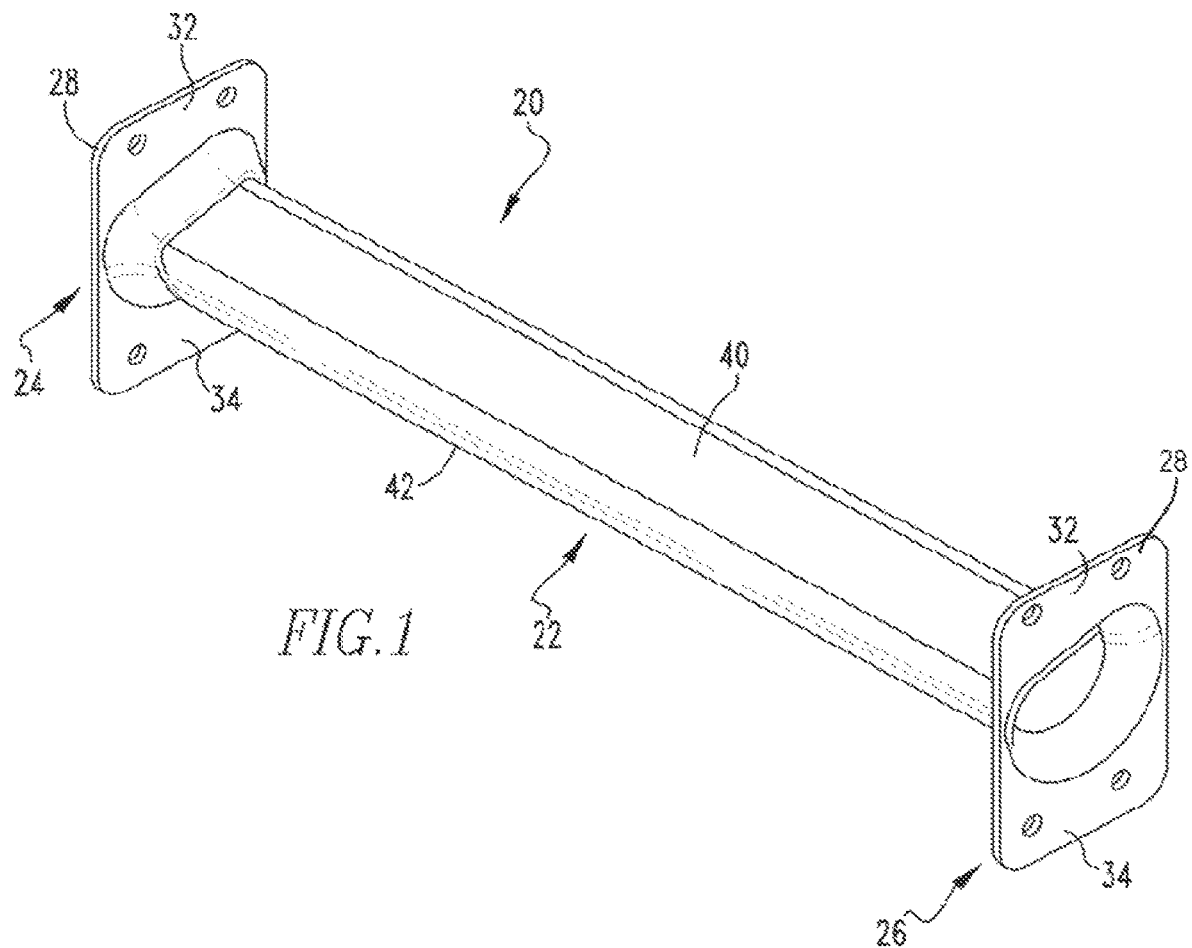
FIG. 1 is an isometric view of a rung of the present invention.
Figure 6:
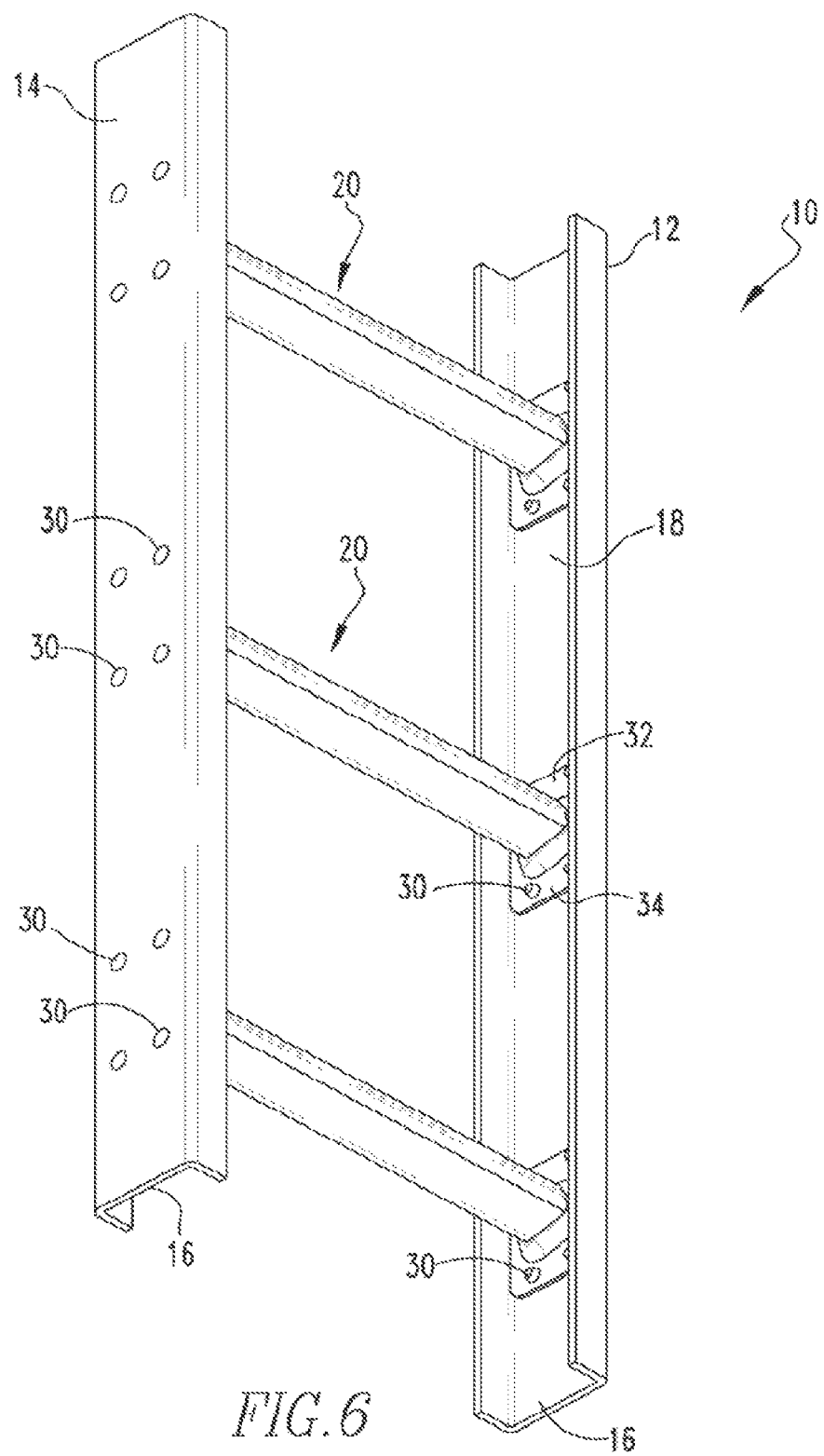
FIG. 6 is a perspective view of a ladder of the present invention.

Referring now to the drawings wherein like reference numerals refer to similar or identical parts throughout the several views, and more specifically to FIGS. 1-6 thereof, there is shown a ladder 10. The ladder 10 comprises a first fiberglass rail having a web 16 with an inner face surface 18. The ladder 10 comprises a second fiberglass rail having a web 16 with an inner face surface 18. The ladder 10 comprises a one-piece composite rung 20 which is hollow and made of carbon fiber or glass that is at least 12 inches long and weighs no more than 0.35 pounds. The rung 20 has a middle 22 and a first end 24 and a second end 26. Each end flares outward from the middle 22 to define a flat face 28 having a shape which corresponds with the web's inner face surface 18 to which the flat face 28 attaches. The ladder 10 comprises rivets 30 that extend through the faces and the inner face surface 18 of the web 16 of the rails to attach the rung 20 to the first rail 12 and the second rail 14. No portion of the rung 20 penetrates any portion of the first or second rails 12, 14.

The first end 24 and second end 26 of the rung 20 may extend perpendicularly from the middle 22. The first end 24 and second end 26 of the rung 20 may have a top 32 and a bottom 34 which extends above and below, respectively, from the middle 22, and the rivets 30 extend through the top 32 and the bottom 34 of the first and second ends 24, 26 into the first and second rails 12, 14, respectively. No other part or component may be used to attach the rung 20 to the rails other than the rivets 30.

The middle 22 may have a flat side 40, also called the logo side 40, and a rounded side 42 underneath the flat 40. The flat side 40 upon which a user places a foot to stand on the rung 20. The rung 20 may have layers 44 of carbon fiber or glass. All layers 44 may be 3K 2×2 twill standard modulus Carbon Fiber Prepreg 215 degree cure.

The present invention pertains to a method for producing a ladder 10. The method comprises the steps of riveting with steel rivets 30 that extend through a flat face 28 of a first end 24 of a composite rung 20 and an inner face surface 18 of a web 16 of a first rail 12 to attach the first end 24 of the rung 20 to the first rail 12. There is the step of riveting with steel rivets 30 that extend through a flat face 28 of a second end 26 of the composite rung 20 and an inner face surface 18 of a web 16 of a second rail 14 to attach the second end 26 of the rung 20 to the second rail 14. The composite rung 20 being one piece which is hollow and made of carbon fiber or glass that is at least 12 inches long and weighs no more than 0.35 pounds. The rung 20 having a middle 22 and the first end 24 and the second end 26. Each end flares outward from the middle 22 to define the flat face 28 of the first end 24 and the flat face 28 of the second end 26. The flat face 28 of the first end 24 and the flat face 28 of the second end 26 having a shape which corresponds with the first rail 12 web's inner face surface 18 and the second rail 14 web's inner face surface 18, respectively, to which the flat face 28 of the first rail 12 and the second rail 14, respectively, attaches. No portion of the rung 20.

The present invention pertains to a method for using a ladder 10. The method comprises the steps of moving the ladder 10 to a desired location. The ladder 10 having a composite rung 20 that is riveted to a first rail 12 of the ladder 10 and a second rail 14 of the ladder 10 opposing the first rail 12 of the ladder 10 with no portion of the rung 20 penetrating any portion of the first or second rails 12, 14. There is the step of placing the ladder 10 into a desired position to be climbed.

The present invention pertains to a method for forming a one-piece composite rung 20 for a ladder 10. The method comprises the steps of placing carbon fibers in a logo side 40 of a tool 48 shown in FIG. 7. The logo side 40 has a flat portion upon which a user places his foot. There is the step of placing carbon fibers in a rounded side 42 of the tool 48 shown in FIG. 8. There is the step of putting the logo side 40 with the carbon fibers and the rounded side 42 with the carbon side of the tool 48 together. There is the step of autoclaving the tool 48 with the logo and rounded sides 40, 42 together to form the rung 20 with a first side having a flat face 28 and a second side having a flat face 28.

Figure 7:
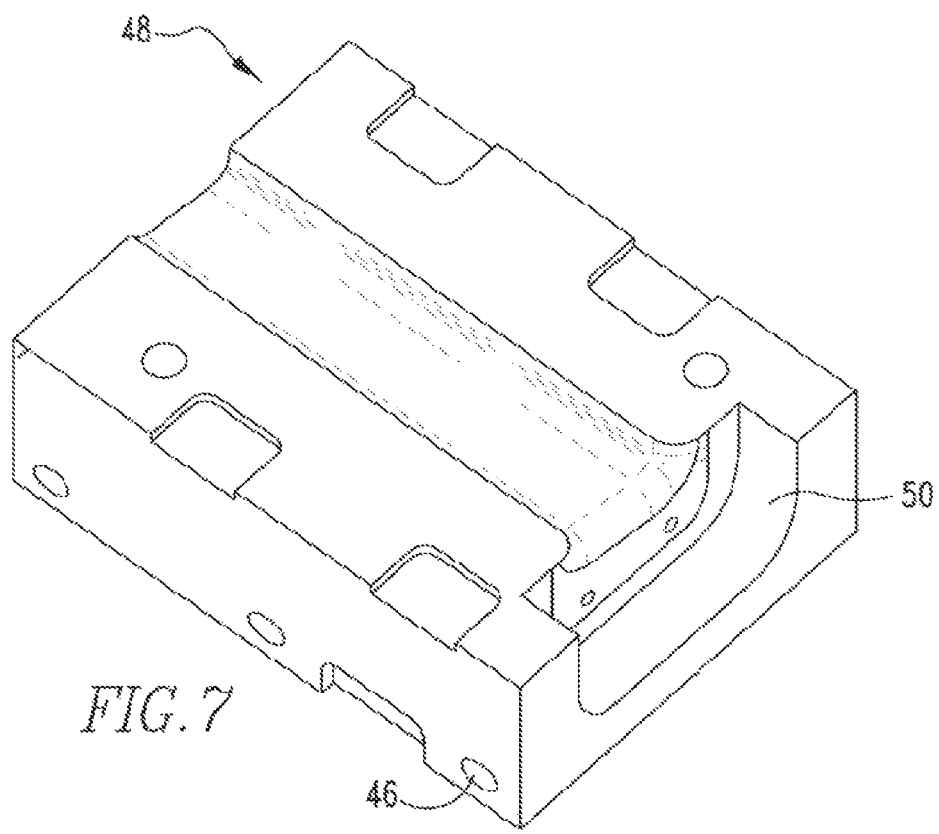
FIG. 7 shows a logo side of a tool.
Figure 8:
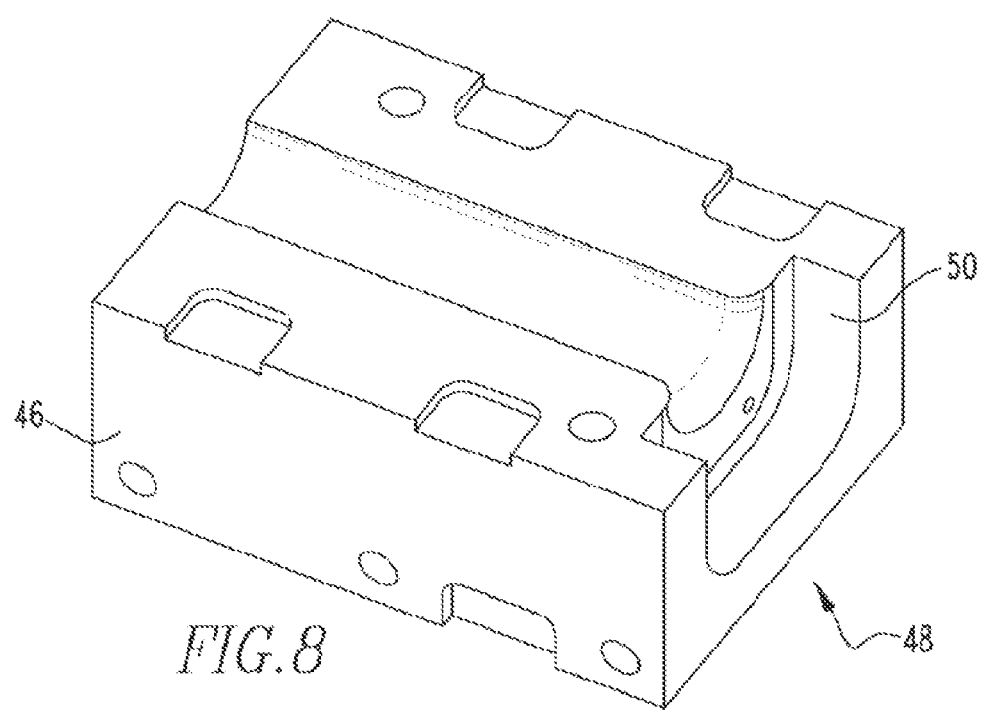
FIG. 8 shows a rounded side of the tool.
Figure 9:
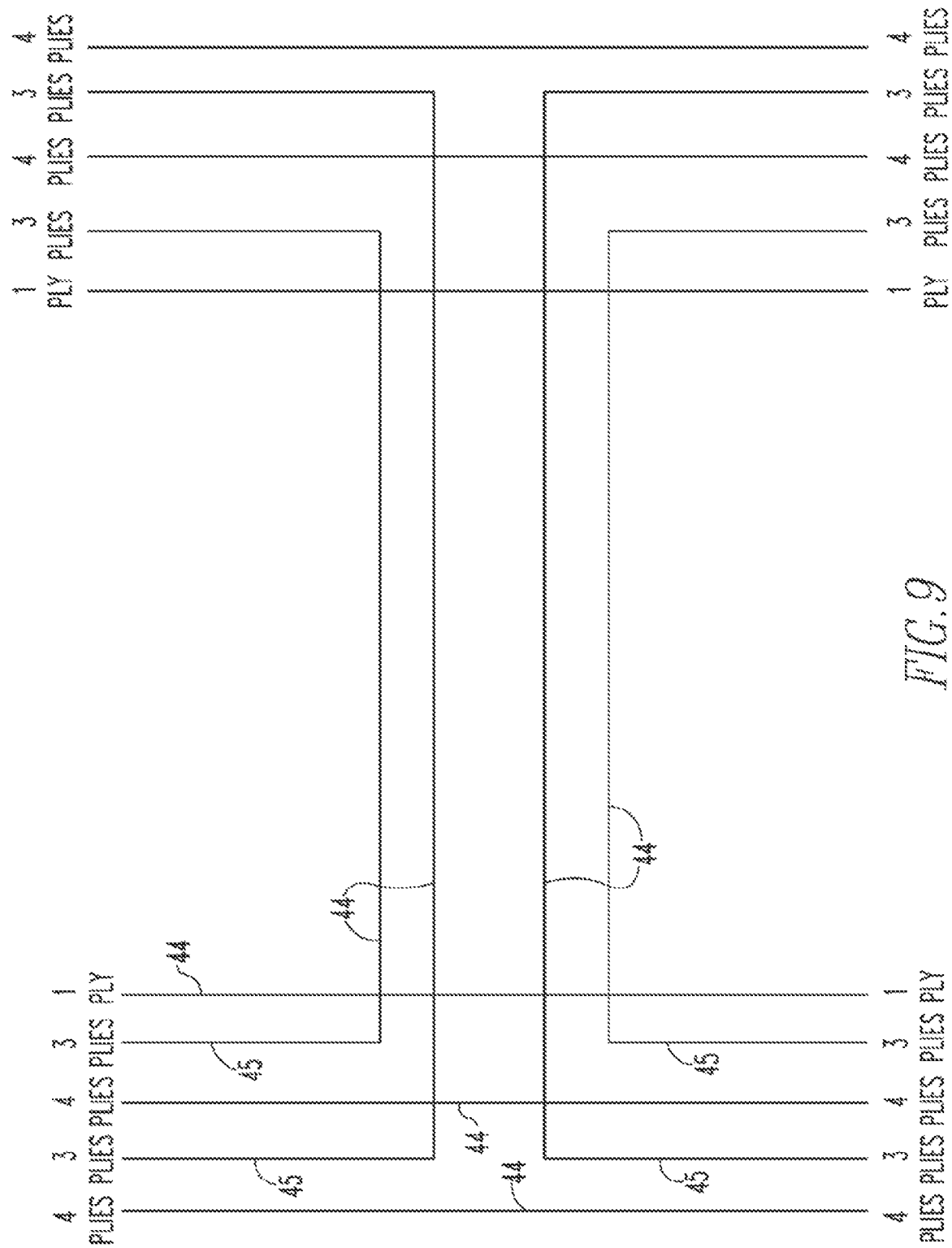
FIG. 9 shows a representation of the layers of the rung.

With reference to FIGS. 7-9, the composite rung 20 is formed as follows using standard autoclave techniques with molds 46 where FIG. 7 shows the logo side 40 of the mold 46, FIG. 8 shows the rounded side 42 of the mold and FIG. 9 shows a schematic representation of the layers 44 which form the composite rung 20. As shown in FIG. 9, the layers which form the composite rung can comprise three plies or four plies. The tool 48 is formed from the molds 46 for the rung 20.

1. All six layers 44 from the Logo side 40 of the tool 48 are cut net.

2. Remaining pieces of Carbon Fiber from Logo side 40 are then used on rounded side 42.

3. Layup of rounded side 42 starts on one side of the tool 48 allowing an overlap to hang on the opposite side.

4. The second layer on the rounded side 42 starts from the opposing side from the first layer, allowing an overlap on the opposite side of the first layers 44 overlap.

5. After the 2 overlaps have been made 1 more layer is added in the center allowing again overlaps on either side.

6. The overlaps on the sides are cut and folded onto the support sides 50 of the rung 20, then 3 layers 44 of Carbon Fiber are laid up on each side. These layers 44 have a hole cut in them to allow the 4 layers 44 of the rung 20 to go through the hole and be folded back onto the support side.

7. All layers 44 after the first 3 layers 44 on the rung 20 on each side are staggered ¼" down from the edge of the overlaps, while alternating the start point to leave staggered layers 44 on both sides.

8. After all layers 44 are laid up, peel six layers on logo side 40 and place on rounded side 42 and close tool 48.

The vertical portions 45 of the layers 44 that extend along the length of the rung 20 alternate or interleave with the strictly vertical layers 44.

All layers 44 are 3K (3000 filaments per fiber) 2×2 twill standard modulus Carbon Fiber Prepreg (pre-impregnated) 215 degree Farenheit cure.

The composite rung integrates rung plates and rung in one complete part. It is comprised of, but not limited to, fabric and/or unidirectional materials such as glass, carbon fiber, and aramid or a combination thereof. The matrix will be comprised of, but not limited to, thermoset Epoxy, thermoset polyurethane, thermoset polyester and thermoplastic polymers.

Present advantages: This design allows for the use of material other than aluminum to be used for rungs. More specifically allows for use of glass, aramid and carbon fiber thus utilizing each material's advantages over aluminum. Kevlar has high abrasion resistance; carbon fiber has a high strength-to-weight ratio and various glasses with high modulus and/or tensile strength are appealing for electrical resistance and high heat applications.

The rung targets a lightweight solution for end users requiring lighter extension ladders. The average weight savings can be about 50% of the total rung weight depending on material used. This can conform to other extension ladder applications, including, but not limited to, high chemical resistance, high electrical resistance, high heat resistance, high abrasion resistance, and high strength/modulus.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:
   a first rail having a first web with a first inner face;
   a second rail having a second web with a second inner face; and
   a rung with a middle portion that is hollow and extends between and to a first flange of the rung and a second flange of the rung that is parallel to and spaced from the first flange, the first flange coupled to the first inner face and the second flange that is coupled to the second inner face, the middle portion of the rung including:
      a first set of fiber layers impregnated with a thermoset or thermoplastic polymer, the first set of fiber layers aligned parallel to each other in a single direction along a length of the middle portion of the rung, the first set of fiber layers including first end portions forming at least a portion of the first flange that extends at an angle relative to the middle portion and second end portions forming at least a portion of the second flange;
      wherein the first flange includes a second set of fiber layers impregnated with the thermoset or thermoplastic polymer, the second set of fiber layers interleaved with the first end portions of the first set of fiber layers; and
      wherein the second flange includes a third set of fiber layers impregnated with the thermoset or thermoplastic polymer, the third set of fiber layers interleaved with the second end portions of the first set of fiber layers.

2. The ladder of claim 1, wherein the first thermoset or thermoplastic polymer includes at least one of epoxy, polyurethane, or polyester, and wherein each of the fiber layers of the first set of fiber layers includes one or more of glass or carbon fiber.

3. The ladder of claim 1, wherein the second set of fiber layers extends in a direction perpendicular to the middle portion of the rung, and wherein the third set of fiber layers extends in a direction perpendicular to the middle portion of the rung.

4. The ladder of claim 1, wherein the first rail and the second rail are formed from a fiberglass material, and wherein the middle portion of the rung has a flat portion and a rounded portion.

5. The ladder of claim 1, wherein the middle portion includes a first end that is opposite and spaced from a second end of the middle portion, the first end of the middle portion having a flared shape, and the second end of the middle portion having a flared shape.

6. The ladder of claim 1, wherein the middle portion, the first flange, and the second flange of the rung are formed as a single component, and wherein the rung is at least 12 inches long and weighs no more than 0.035 pounds.

7. The ladder of claim 1, wherein the ladder further includes a first set of rivets that extend through the first flange and the first inner face of the first rail to attach the rung to the first rail and a second set of rivets that extend through the second flange and the second inner face of the second rail to attach the rung to the second rail, wherein no other part or component is used to attach the rung to the first rail and the second rail other than the first set of rivets and the second set of rivets.

8. A rung comprising:
   a first flange;
   a second flange that is parallel to and spaced from the first flange; and
   a middle portion that is hollow and extends between and to the first flange and the second flange, the middle portion including:
      a first set of fiber layers impregnated with a thermoset or thermoplastic polymer, the first set of fiber layers aligned parallel to each other in a single direction along a length of the middle portion of the rung, the first set of fiber layers including first end portions forming at least a portion of the first flange that extends at an angle relative to the middle portion and including second end portions forming at least a portion of the second flange;
      wherein the first flange includes a second set of fiber layers impregnated with the thermoset or thermoplastic polymer, the second set of fiber layers interleaved with the first end portions of the first set of fiber layers; and
      wherein the second flange includes a third set of fiber layers impregnated with the thermoset or thermoplastic polymer, the third set of fiber layers interleaved with the second end portions of the first set of fiber layers.

9. The rung of claim 8, wherein the first flange includes a first top portion and a first bottom portion, wherein the second flange includes a second top portion and a second bottom portion, wherein the first set of fiber layers includes at least one layer that defines the first top portion of the first flange, the middle portion, and the second top portion of the second flange, and wherein the first set of fiber layers includes at least one layer that defines the first bottom portion of the first flange, the middle portion, and the second bottom portion of the second flange.

10. The rung of claim 8, wherein the first set of fiber layers includes at least one layer with three plies.

11. The rung of claim 8, wherein the second set of fiber layers includes at least one layer with four plies, and wherein the third set of fiber layers includes at least one layer with four plies.

12. The rung of claim 8, wherein the rung has a weight to length ratio less than or equal to about 0.029 pounds per inch.

* * * * *

UNITED STATES PATENT AND TRADEMARK OFFICE
CERTIFICATE OF CORRECTION

| | | |
|---|---|---|
| PATENT NO. | : 12,134,936 B2 | Page 1 of 1 |
| APPLICATION NO. | : 17/005084 | |
| DATED | : November 5, 2024 | |
| INVENTOR(S) | : Daniel C. Mora | |

It is certified that error appears in the above-identified patent and that said Letters Patent is hereby corrected as shown below:

On the Title Page

In Item (54), under "Title", and in the Specification Column 1, Line 1, delete "LADDER" and insert -- Ladder and Ladder Therewith --, therefor.

In Item (62), under "Related U.S. Application Data", in Column 1, Line 1, delete "Division" and insert -- Continuation --, therefor.

In the Claims

In Column 5, Claim 2, Line 38, delete "first thermoset" and insert -- thermoset --, therefor.

Signed and Sealed this
First Day of April, 2025

Coke Morgan Stewart
*Acting Director of the United States Patent and Trademark Office*